July 10, 1934.                C. T. HENDERSON                1,965,701
                        METHOD OF WALNUT BLEACHING
                            Filed Sept. 4, 1929
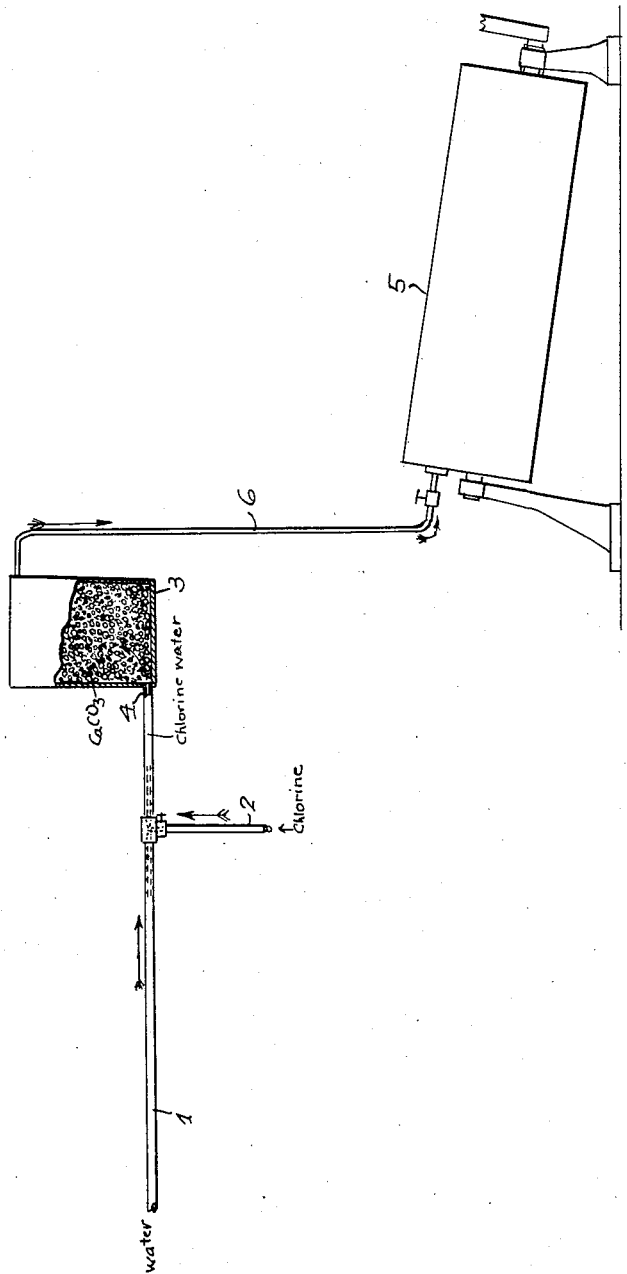
INVENTOR
CLARK T. HENDERSON
By
ATTORNEY Patented July 10, 1934

1,965,701

UNITED STATES PATENT OFFICE 1,965,701

METHOD OF WALNUT BLEACHING

Clark T. Henderson, Burlingame, Calif.

Application September 4, 1929, Serial No. 390,378

2 Claims. (Cl. 99—11)

This invention relates to a method of walnut bleaching; and it comprises a process wherein English walnuts are simultaneously lightened in color, made uniform in appearance, scoured and disinfected by subjecting said nuts to the conjoint action of a solution of HOCl and the abrasion produced by tumbling said nuts in the solution; all as more fully hereinafter set forth and as claimed.

Another object of the invention is to provide a method of bleaching English walnuts, which consists in subjecting the walnut to the action of the reaction product of a solution of $Cl_2$ in water, which has been brought in contact with $CaCO_3$.

Other objects of the invention together with the foregoing, will be set forth in the following description of the preferred method, practicing the same, which is illustrated in the drawing accompanying and forming part of the specification. It is to be understood that I do not limit myself to the embodiment disclosed in said description and the drawing, as I may adopt variations of my preferred forms within the scope of my invention as set forth in the claims.

The figure on the accompanying drawing illustrates a diagrammatic view of an embodiment of my method.

English walnuts are extensively bleached before marketing for the purpose of improving their appearance and at the same time killing mould spores which might cause mildew and similar discoloration in storage.

Heretofore it has been the custom to bleach English walnuts with calcium hypochlorite, sodium hypochlorite or mixtures of the two.

I have discovered that a superior bleaching and sterilizing can be accomplished by the use of HOCl, (hypochlorous acid) uncombined with an alkaline base.

My procedure is to first make a solution of $Cl_2$ in water. This solution may be made by passing the water in a conduit 1, into which is connected another conduit for conducting chlorine therethru to said water. Then this solution is passed into a suitable container 3 filled with ground $CaCO_3$. The degree of fineness is not material and may vary from powdered to rather coarsely crushed. Preferably I introduce the solution of Cl at the bottom 4, of the container and allow it to pass upwards thru the $CaCO_3$, however the arrangement may be varied, the essential requirement being contact between the $CaCO_3$ and the $Cl_2$ solution.

A solution of $Cl_2$ in water reacts with the calcium carbonate to form a liquor containing HOCl as well as $CO_2$, calcium bicarbonate and calcium chloride. The "available chlorine" of the solution remains unchanged; that is, the HOCl has the same oxidizing power as the original chlorine.

The English walnuts are subjected to the action of HOCl in an inclined rotating drum 5, or similar equipment, which will bring all surfaces of the nuts in contact with the bleaching and sterilizing solution and at the same time subject the nuts to scouring action one against another. The product of the reaction is conducted from the top of the container 3 to the drum 5 by a conduit 6.

By properly proportioning the flow of the HOCl solution to the bleacher, the desired color is obtained.

English walnuts as they go on the market are frequently discolored and do not have the light, uniform appearance desired. In the prior art, reliance has been placed upon the sheer bleaching power of hypochlorite solutions. In the present invention, an HOCl solution is used with simultaneous tumbling of the nuts to produce mutual abrasion and scouring. In so doing, the amount of chlorine needed is lessened and the risk of injury to the edibility of the nuts is lessened. By using an HOCl solution of the character described, it becomes feasible to employ ordinary apparatus; the solution having little corrosive power on iron and steel. The detaching action of the abrasion enables the use of relatively little chlorine for making a marketable product. But a short time of operation is required. In practice, the nuts are placed in rotating drum 5 and the described solution, which contains calcium bicarbonate in solution, is added. This takes care of any free HCl which may be developed. As a matter of fact, it is found that in operation of the present process there is but little tendency toward production of HCl; the HOCl disappearing as a whole molecule. There is possibly what may be called a chlorhydrination. The use of ordinary apparatus in treating the nuts in this way and with this solution does not result in additional discoloration by iron coming from the apparatus.

Having thus described this invention, what I claim and desire to secure by Letters Patent is:

1. In the bleaching and sterilization of English walnuts by chlorine in available form, a process which comprises economizing time and bleaching agent by subjecting the nuts to the action of a solution formed by contacting an aqueous solution of chlorine with calcium carbonate, said solution containing HOCl, calcium chloride and some calcium bicarbonate and free $CO_2$, and scouring the nuts in said solution during said action.

2. In the improvement in the appearance of walnuts and the sterilization of their surfaces, the process which comprises rubbing the nuts together in a solution obtained by passing chlorine and water through a tower containing fragmentary calcium carbonate.

CLARK T. HENDERSON.